March 31, 1964  J. R. REED  3,126,910
BIDIRECTIONAL FLOW RESTRICTOR VALVE
Filed June 25, 1962
2 Sheets-Sheet 2

INVENTOR.
JAMES R. REED
BY
*W. E. Finher*
ATTORNEY 3,126,910
BIDIRECTIONAL FLOW RESTRICTOR VALVE
James R. Reed, Indianapolis, Ind., assignor to General Motors Corporation, Detroit, Mich., a corporation of Delaware
Filed June 25, 1962, Ser. No. 204,919
1 Claim. (Cl. 137—493)

This invention pertains to rotary shock absorbers, and particularly to a shock absorber designed for use on a military vehicle.

It is desirable to provide military vehicles, such as tanks, with shock absorbers that control the rate of movement on compression and rebound between sprung and unsprung masses and, in addition, embody means for disabling the shock absorbers to provide a stable platform. The present invention relates to a rotary shock absorber having adjustable damping means and locking means for securing the suspension when necessary. Accordingly, among my objects are the provision of as improved direct acting, rotary shock absorber; the further provision of an adjustable bidirectional flow restrictor valve for a shock absorber; and the still further provision of a rotary shock absorber utilizing a coil spring as the bidirectional flow restrictor valve element and including a locking valve for disabling the shock absorber.

The aforementioned and other objects are accomplished in the present invention by embodying coaxial stator and rotor members in the shock absorber and controlling the rate of flow of hydraulic fluid between the chambers thereof. Specifically, the improved rotary shock absorber comprises an annular working chamber having diametrically opposed pairs of stator and rotor vanes which define two pairs of expansible chambers. Each pair of expansible chambers is completely filled with hydraulic fluid, and communicate with each other through a bidirectional flow restrictor valve which provides the same rate on compression and rebound. A single locking valve is utilized to prevent flow between the two expansible chambers of one pair so as to disable the shock absorber and secure the suspension.

Further objects and advantages of the present invention will be apparent from the following description, reference being had to the accompanying drawings, wherein a preferred embodiment of the present invention is clearly shown and wherein similar numerals depict similar views throughout the several views.

Figure 1:
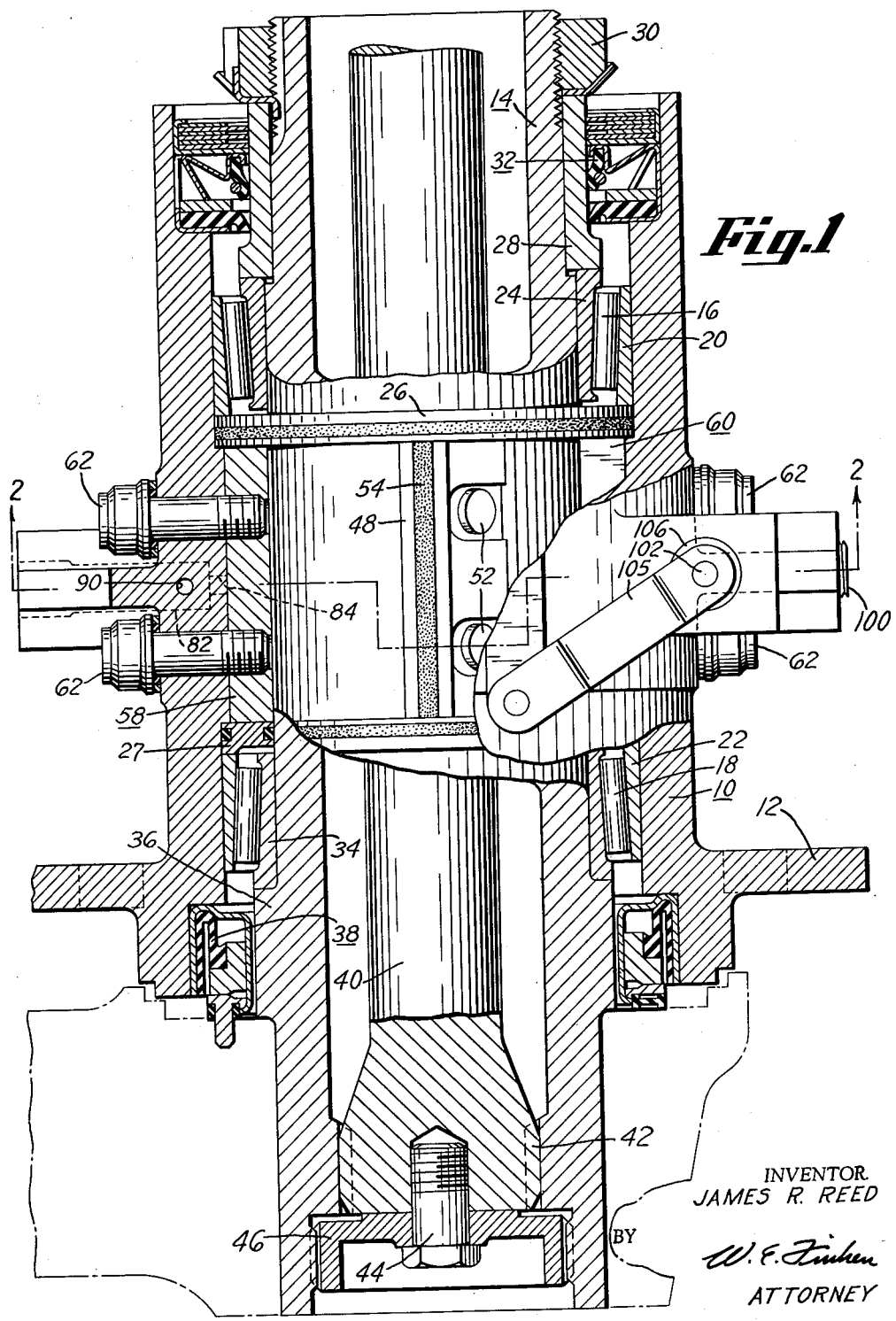
FIGURE 1 is a view, partly in section and partly in elevation, with certain parts broken away, depicting a shock absorber constructed according to the present invention.

Referring to FIGURE 1, the shock absorber includes an annular stator 10 having a mounting flange 12 and a coaxial tubular rotor 14 which extends therethrough. The rotor 14 is journalled in the stator 10 by spaced roller bearing assemblies 16 and 18 having tapered outer roller races 20 and 22, respectively, press-fitted in the stator 10 and seated against annular end walls 26 and 27, respectively. The tapered inner race 24 of the bearing 16 is spaced from annular end wall 26 and is retained by a collar 28, the collar 28 being held in assembled relation with the rotor 14 by a nut 30. A seal assembly 32 is provided between the upper end of the stator and the rotor. The tapered inner race 34 of the roller bearing assembly 18 is spaced from annular end wall 27 and is seated against a shoulder 36 of the rotor 14. A second seal assembly 38 is provided at the lower end of the stator and rotor. A shaft 40 is disposed within the rotor 14, the shaft being connected by straight splines 42 to the rotor 14 and attached by a bolt 44 to an end cap 46. Oscillatory movement is imparted to the rotor 14 through the shaft 40, it being understood that the shaft 40 and the rotor 14 are connected to the sprung mass, while the stator 10 is connected at its mounting flange 12 to the unsprung mass.

Figure 2:
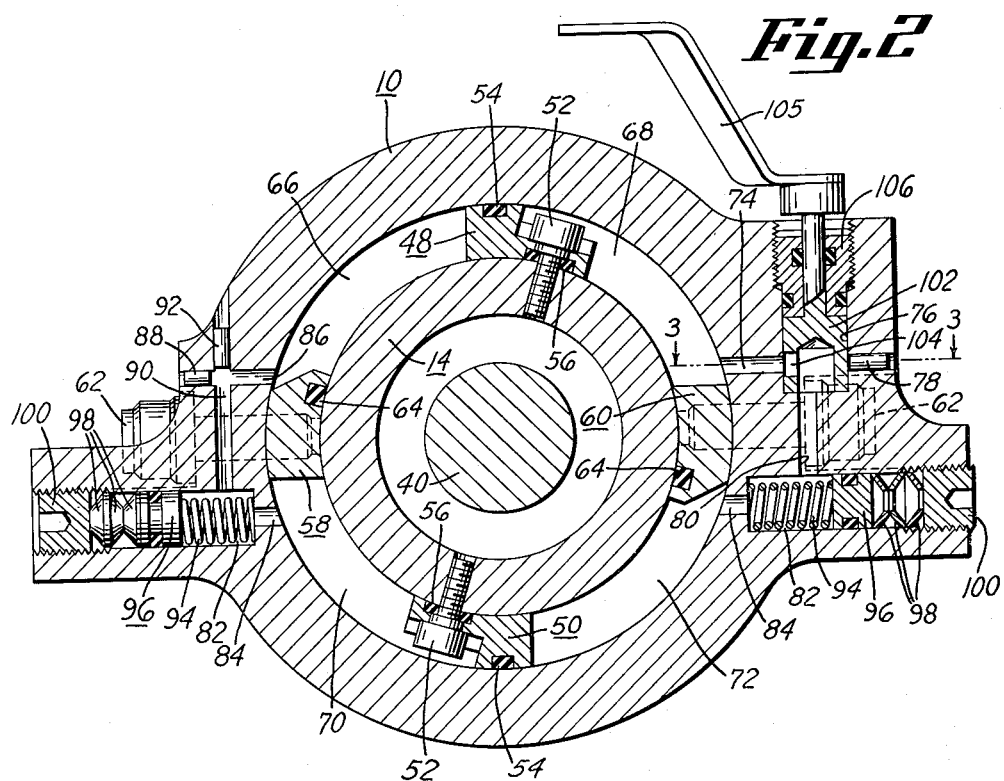
FIGURE 2 is a sectional view taken along line 2—2 of FIGURE 1.
Figure 3:
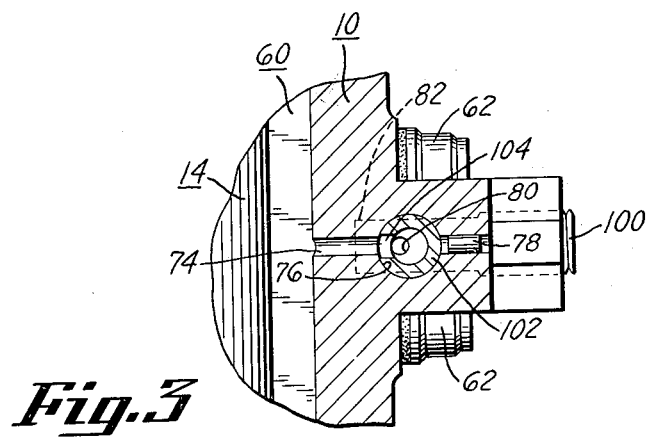
FIGURE 3 is a fragmentary, sectional view taken along line 3—3 of FIGURE 2.

The annular working chamber of the shock absorber is defined by upper annular end wall 26, lower annular end wall 27, the inner periphery of the stator 10 and the outer periphery of the rotor 14. Referring to FIGURE 2, the rotor 14 has a pair of diametrically opposed vanes 48 and 50 attached thereto by bolts 52, the vanes 48 and 50 carrying seals 54 which engage the inner periphery of the stator 14, and seals 56 which surround the bolts 52. A second pair of diametrically opposed vanes 58 and 60 is secured to the stator 10 by bolts 62. The stator vanes 58 and 60 carry seals 64 which engage the outer periphery of the rotor 14.

The rotor vane 48 defines expansible chambers 66 and 68 with the stator vanes 58 and 60, respectively. Similarly, the rotor vane 50 defines expansible chambers 70 and 72 with the stator vanes 58 and 60, respectively. The opposed chambers 68 and 72 are hydraulically interconnected, as are the opposed chambers 66 and 70.

Thus, as seen in FIGURE 2, the stator 10 has a radial passage 74 connecting expansible chamber 68 with a valve bore 76, the outer end of the passage 74 being blocked by a pin 78. The valve bore 76 connects with a paassge 80, the passage 80 communicating with a valve bore 82 connected by a radial passage 84 with the expansible chamber 72. Similarly, the expansible chamber 66 is connected by a radial passage 86, the outer end of which is blocked by a pin 88 with a passage 90, the outer end of which is blocked by a pin 92, to a second valve bore 82 likewise connected by passage 84 to the expansible chamber 70.

Each valve bore 82 contains a bidirectional flow control valve comprising a helically wound coil spring 94, the center of which communicates with the passage 84. Each coil spring 94 is engaged by a piston 96, a plurality of Belleville spring washers 98 being interposed between each piston 96 and an adjusting screw 100. The four expansible chambers 66, 68, 70 and 72 are completely filled with hydraulic fluid. Thus, hydraulic fluid can flow between chambers 68 and 72 through the right hand coil spring 94 which constitutes the control valve. Similarly, hydraulic fluid can flow between chambers 66 and 70 through the left hand coil spring 94.

The rate of fluid flow in both directions is controlled by the gaps between adjacent convolutions of each coil spring 94 in accordance with the degree of compression thereof. Thus, upon clockwise movement of the rotor 14 such that the chambers 68 and 70 are collapsed while the chambers 66 and 72 are expanded, hydraulic fluid from the chamber 68 flows through passage 74 to the valve bore 76 and thence through the passage 80 to the valve bore 82. The hydraulic fluid in the valve bore 82 must flow through the gaps between adjacent helical convolutions of the coil spring 94 to pass through the passage 84 to the chamber 72. In a similar fashion, hydraulic fluid from chamber 70 must pass through passage 84 to the interior of the coil spring 94 and through the gaps between adjacent helical convolutions of the coil spring to the bore 82 and then through passages 90 and 86 to the chamber 66. The flow rate of each coil spring 94 is the same in both directions as determined by the adjustment of its screw 100 to obtain the required snubbing action, and in this manner the flow rates of both valves can be adjusted to be substantially identical.

However, if excessive pressure is developed during movement between the rotor and the stator, the Belleville washers 98 will be compressed by outward movement of the pistons 96 to expand the coil springs 94 and thus permit greater rates of flow between the chambers of the shock absorber. For this reason it is important that the circular area of each piston 96 exposed to its valve bore 82 internally of its coil spring 94 be substantially equal to the annular area of the piston 96 exposed to its valve bore 82 externally of the coil spring 94.

In order to provide a stable platform for the military vehicle, the shock absorber of the present invention embodies locking means comprising a rotary valve element 102 disposed in the valve bore 76, the rotary valve element having a radial port 104 adapted to interconnect the passage 74 with the hollow interior thereof. The rotary valve 102 is connected to an operating lever 105 and is held in assembled relation with the stator 10 by a nut 106 having suitable seals. When the valve 102 is rotated so as to block communication with the passage 74 and the port 104, the flow of hydraulic fluid is blocked between the chambers 68 and 72 thus disabling the shock absorber.

While the embodiment of the invention as herein disclosed constitutes a preferred form, it is to be understood that other forms might be adopted.

What is claimed is as follows:

A bidirectional flow restrictor valve for controlling the rate of flow in both directions between expansible chambers of a hydraulic shock absorber, comprising a valve bore communicating with said chambers, a coil spring disposed in said valve bore having a plurality of helical convolutions, a piston engaging one end of said coil spring and having substantially equal areas exposed to said valve bore internally and externally of the convolutions of said coil spring, an adjusting screw spaced from said piston, and a plurality of spring washers disposed between said adjusting screw and said piston, the rate of flow between said chambers being controlled by the gaps between adjacent convolutions of said coil spring, said piston being movable under the urge of excessive pressure against said spring washers to relieve the compression of said coil spring and thus increase the rate of flow between said expansible chambers.

References Cited in the file of this patent

UNITED STATES PATENTS

| | | |
|---|---|---|
| 342,275 | Walters | May 18, 1886 |
| 740,473 | Scherer | Oct. 6, 1903 |
| 928,837 | Astrom | July 20, 1909 |
| 1,151,326 | Anderson | Aug. 24, 1915 |
| 1,540,341 | Kirby | June 2, 1925 |
| 1,802,350 | McIntyre | Apr. 28, 1931 |
| 1,835,467 | Cautley | Dec. 8, 1931 |
| 1,893,625 | Land | Jan. 10, 1933 |
| 2,095,770 | Sorensen | Oct. 12, 1937 |
| 2,997,140 | Rumsey et al. | Aug. 22, 1961 |

FOREIGN PATENTS

| | | |
|---|---|---|
| 10,951 | Austria | of 1903 |
| 153,362 | Sweden | Feb. 7, 1956 |